2,886,584
Patented May 12, 1959

2,886,584

CYANO SUBSTITUTED ALIPHATIC ISOTHIOCYANATES

Arthur F. McKay, Pointe Claire, Quebec, and David L. Garmaise, Montreal, Quebec, Canada, assignors to Monsanto Canada Limited, Montreal, Quebec, Canada No Drawing. Application October 14, 1957
Serial No. 689,758

Claims priority, application Great Britain
October 16, 1956

14 Claims. (Cl. 260—454)

This invention relates to a new class of cyanosubstituted aliphatic isothiocyanates.

These compounds have the general formula

wherein A represents an alkyl radical having from 2 to 14 carbon atoms and wherein the alkyl radical may have straight or a branched chain. The compounds of the above general formula may be prepared in accordance with the invention from the corresponding cyanoalkylamines of the general formula

by one of two methods to be described herein. These compounds have bacteriostatic activity.

A preferred method is to heat the cyanoalkylamine with carbon disulfide in an inert solvent, desirably an inert chloronated solvent, for example, chloroform at a temperature within the range from about −10° C. to about 0° C. in the presence of one mole equivalent of a tertiary amine, for example, triethylamine. When the formation of the cyanoalkyldithiocarbamate salt is complete, which is assured by raising the temperature, for example, to about 25° C., one mole equivalent of ethyl chloroformate is added at a temperature within the range from about −10° C. to about 0° C. The carbethoxy cyanoalkyldithiocarbamate formed thereby is decomposed by the addition of base, for example, triethylamine. The resulting chloroform solution, after extraction with aqueous acid and aqueous alkali, is fractionally distilled to obtain the pure cyanoalkylisothiocyanate free from the solvent.

In another preferred method, the cyanoalkylamine may be combined with one mole equivalent of carbon disulfide in the presence of a base, for example, triethylamine, in a neutral solvent, for example, methylene chloride. When this reaction is complete, the resulting cyanoalkyldithiocarbamate salt is oxidized with sodium hypochlorite at a pH within the range from about 8 to 9 at a temperature within the range from about 3° C. to about 8° C. The methyl chloride solution is then fractionally distilled to obtain the pure cyanoalkylisothiocyanate.

The preferred solvents for carrying out these methods are inert chlorinated solvents with chloroform, methylene chloride and carbon tetrachloride preferred.

The cyanoalkylisothiocyanates of the invention have marked bacteriostatic activity. The lower members of the series, for example 2-cyanoethylisothiocyanate, were effective in inhibiting the growth of gram-negative organisms, for instance Pr. mirabilis and Pr. vulgaris. The higher members, for example, 10-cyanodecylisothiocyanate were more effective on gram-positive organisms for instance Staph, pyogenes and Strept. faecalis. Moreover, the bacteriostatic activity of the cyanoalkylisothiocyanates were not greatly decreased in the presence of serum or milk. 2-cyanoethylisothiocyanate was also shown to have herbicidal activity.

In use as bacteriostatic agents the compounds of the invention may be in the form of a composition including a carrier or another active substance or both. They may be in solid or liquid form as will be readily understood by one skilled in the art in which such compositions are made and used. Since the active substances are new themselves these substances form a part of the invention as well as compositions of the substances with other materials.

The following examples will serve to illustrate preferred procedures according to the invention.

EXAMPLE I 2-cyanoethylisothiocyanate

A solution of carbon disulfide (7.8 parts) in 30 parts of chloroform was added dropwise to a stirred solution of β-aminopropionitrile (7 parts) and triethylamine (10.1 parts) in 45 parts of chloroform. The addition period was thirty minutes and the temperature was maintained at −10° C. The cooling bath was removed and the reaction was stirred for five minutes at 25° C. Ethyl chloroformate (10.9 parts) was added dropwise over a period of twenty minutes at 0° C. The temperature was allowed to rise to 17° C. Over a period of twenty minutes. A solution of triethylamine (10.1 parts) in chloroform (45 parts) was added dropwise at 17° C. over a period of ten minutes and the solution was diluted with chloroform (150 parts). The chloroform solution was washed with 5% hydrochloric acid solution (2 x 30 parts) and water (2 x 30 parts). Fractional distillation of the chloroform solution afforded 2-cyanoethylisothiocyanate (9.4 parts; 77%) as a colorless liquid, B.P. 84° C./0.07 mm., $n_D^{25}$ 1.5400 and $d_4^{20}$ 1.166. Analysis of the new compound gave 42.94% carbon, 3.73% hydrogen, 24.39% nitrogen and 28.28% sulfur compared with the theoretical calculated for $C_4H_4N_2S$ of 42.84% carbon, 3.59% hydrogen, 24.98% nitrogen and 28.59% sulfur.

EXAMPLE II 2-cyanoethylisothiocyanate

A solution of carbon disulfide (7.8 parts) in methylene chloride (20 parts) was added dropwise to a solution of β-aminopropionitrile (7 parts) and triethylamine (10.1 parts) in methylene chloride (20 parts) at 5–10° C. After being allowed to stand for one hour at 20° C., the solution was diluted with methylene chloride (230 parts). Sodium hypochlorite solution (4 molar equivalents) and 10% sodium hydroxide solution were added simultaneously to the reaction with vigorous stirring at 3–8° C. The addition of sodium hydroxide was adjusted so as to maintain the pH at 8–9. After the addition was complete, the solution was stirred for thirty minutes at 8° C. The methylene chloride layer was separated an dried over sodium sulfate. Fractional distillation of the solution yielded 3.9 parts of 2-cyanoethylisothiocyanate (B.P. 110–114° C./0.5 mm.).

EXAMPLE III 1-methyl-2-cyanoethylisothiocyanate

A solution of carbon disulfide (7.8 parts) in chloroform (15 parts) was added dropwise to a stirred solution of 3-aminobutyronitrile (8.4 parts) and triethylamine (10.1 parts) in chloroform (45 parts). The temperature was maintained at −10° C. during the addition period, fifty-five minutes. The cooling bath was removed for thirty minutes and the reaction was stirred for five minutes at 20° C. Ethyl chloroformate (10.9 parts) was added dropwise over a period of twenty minutes at −10° C. The temperature was allowed to rise to 20° C. in a thirty minute period. A solution of triethylamine (10.1 parts) in chloroform (45 parts) was added dropwise over a period of twenty minutes at 20–22° C., and the solution was diluted with chloroform (150 parts). The solution was washed with four portions of 5% hydrochloric acid solution (50 parts), 5% sodium hydroxide solution (2 x 50 parts) and water (2 x 50 parts). The chloroform solution was fractionally distilled and 1-methyl-2-cyanoethylisothiocyanate was obtained in 79.5% (10 parts) yield as a colorless liquid (B.P. 67–69° C./0.085 mm., $n_D^{25}$ 1.5180; $d_4^{20}$ 1.120). Analysis of the new compound gave 47.89% carbon, 4.95% hydrogen and 21.72% nitrogen compared with the calculated for $C_5H_6N_2S$ of 47.60% carbon, 4.76 hydrogen and 22.21% nitrogen.

EXAMPLE IV

*2-cyanopropylisothiocyanate*

2-methyl-3-aminopropionitrile (8.4 parts) was converted by the procedure outlined in Example III to 2-cyanopropylisothiocyanate (B.P. 71–72° C./0.09 mm., $n_D^{25}$ 1.5235, $d_4^{20}$ 1.118), yield 79.5%. Analysis of this new compound gave 47.96% carbon, 5.17% hydrogen, 22.17% nitrogen and 24.80% sulfur compared with the theoretical calculated for $C_5H_6N_2S$ of 47.60% carbon, 4.76% hydrogen, 22.21% nitrogen and 25.40% sulfur.

EXAMPLE V

*3-cyanopropylisothiocyanate*

4-aminobutyronitrile was converted by the procedure outlined in Example III to 3-cyanopropylisothiocyanate (B.P. 106° C./0.05 mm., $n_D^{25}$ 1.5262, $d_4^{20}$ 1.155), yield 70.5%. Analysis of the new compound gave 47.79% carbon and 5.18% hydrogen compared with the calculated for $C_5H_6N_2S$ of 47.60% carbon and 4.76% hydrogen.

EXAMPLE VI

*4-cyanobutylisothiocyanate*

5-aminovaleronitrile was converted by the procedure outlined in Example III to 4-cyanobutylisothiocyanate (B.P. 110–112° C./0.07 mm., $n_D^{25}$ 1.5098, $d_4^{20}$ 1.160), yield 73.5%.

EXAMPLE VII

*5-cyanopentylisothiocyanate*

6-aminovaleronitrile was converted into 5-cyanopentylisothiocyanate (B.P. 123–125° C./0.17 mm. $n_D^{25}$ 1.5159, $d_4^{20}$ 1.092) in 74% yield by the procedure described in Example III. Analysis of the new compound gave 54.50% carbon, 6.38% hydrogen, 18.49% nitrogen and 20.40% sulfur compared with the theoretical calculated for $C_7H_{10}N_2S$ of 54.53% carbon, 6.54% hydrogen, 18.18% nitrogen and 20.79% sulfur.

EXAMPLE VIII

*6-cyanohexylisothiocyanate*

7-aminoheptanonitrile was converted by the procedure given in Example III into 6-cyanohexylisothiocyanate (B.P. 132–133° C./0.32 mm., $n_D^{25}$ 1.5090, $d_4^{20}$ 1.052) in 73% yield. Analysis of this new compound gave 57.23% carbon, 7.23% hydrogen and 16.83% nitrogen compared with the theoretical calculated for $C_8H_{12}N_2S$ of 57.09% carbon, 7.19% hydrogen and 16.66% nitrogen.

EXAMPLE IX

*10-cyanodecylisothiocyanate*

11-aminoundecanonitrile was converted by the procedure outlined in Example III into 10-cyanodecylisothiocyanate (B.P. 155–156° C./0.10 mm., $n_D^{25}$ 1.4970, $d_4^{20}$ 0.983) in 75.3% yield.

EXAMPLE X

*14-cyanotetradecylisothiocyanate*

15-aminopentadecanonitrile was converted into 14-cyanotetradecylisothiocyanate (B.P. 215–220° C./0.15 mm.) by the procedure given in Example III.

We claim:

1. A compound represented by the general formula

NC(A)NCS wherein A represents an alkylene radical having from 2 to 14 carbon atoms.

2. A compound as defined in claim 1 in which the alkylene radical has a straight chain.

3. A compound as defined in claim 1 in which the alkylene radical has a branched chain.

4. 2-cyanoethylisothiocyanate.

5. 1-methyl-2-cyanoethylisothiocyanate.

6. 2-cyanopropylisothiocyanate.

7. 6-cyanohexylisothiocyanate.

8. 10-cyanodecylisothiocyanate.

9. A process for preparing a cyanoalkylisothiocyanate, comprising reacting a cyano substituted alkylamine in which the alkyl group contains from 2 to 14 carbon atoms with carbon disulfide in the presence of triethylamine in an inert solvent at a temperature within the range from —10° C. to 25° C., to form the corresponding cyanoalkyldithiocarbamate salt, adding ethyl chloroformate to form the carbethoxy cyanoalkyldithiocarbamate, and then adding one mole equivalent of triethylamine to decompose the said carbethoxy cyanoalkyldithiocarbamate to the corresponding cyanoalkylisothiocyanate.

10. A process as defined in claim 9 in which the solvent is a chlorinated solvent.

11. A process as defined in claim 9 in which the solvent is chloroform.

12. A process for preparing a cyanoalkylisothiocyanate, comprising reacting a cyanosubstituted alkylamine in which the alkyl group contains from 2 to 14 carbon atoms with carbon disulfide in the presence of triethylamine in a neutral solvent at a temperature within the range from —10° C. to 25° C., to form the cyanoalkyldithiocarbamate salt, and thereafter oxidizing the cyanoalkyldithiocarbamate salt with sodium hypochlorite to form the corresponding cyanoalkylisothiocyanate.

13. A process as defined in claim 12 in which the solvent is an inert chloride solvent.

14. A process as defined in claim 12 in which the solvent is methylene chloride.

References Cited in the file of this patent

UNITED STATES PATENTS

| | | |
|---|---|---|
| 2,394,915 | Jones | Feb. 12, 1946 |
| 2,462,433 | Searle | Feb. 22, 1949 |

OTHER REFERENCES

Beilstein: Organische Chemie, vol. 3, p. 312 (1921).